(No Model.)
T. C. SONNEMANN.
CHURN.
No. 426,872. Patented Apr. 29, 1890.
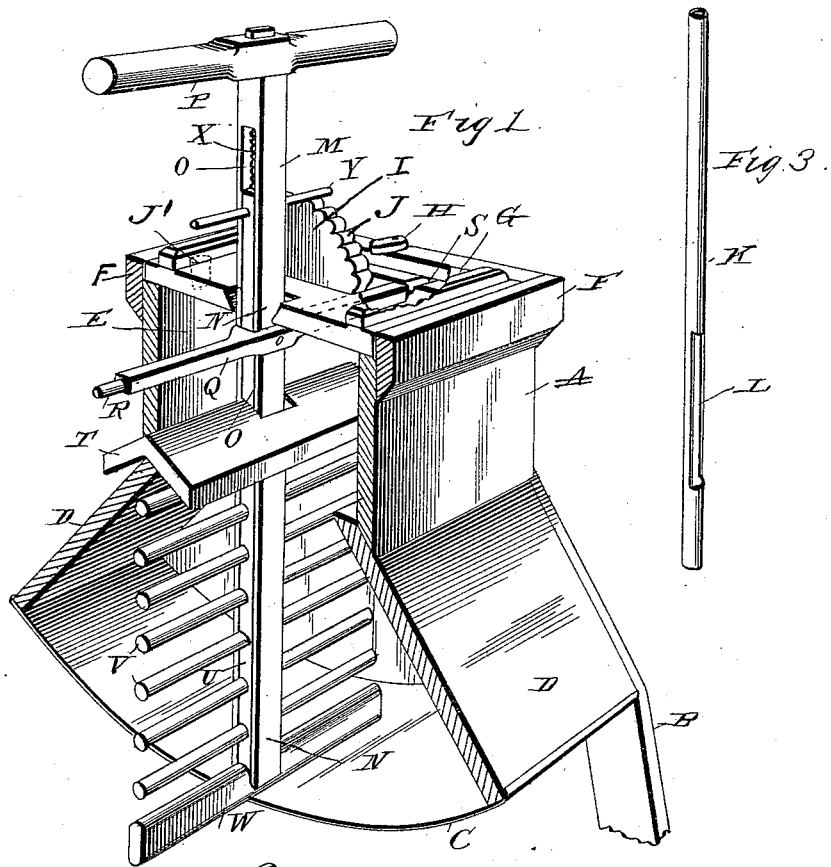
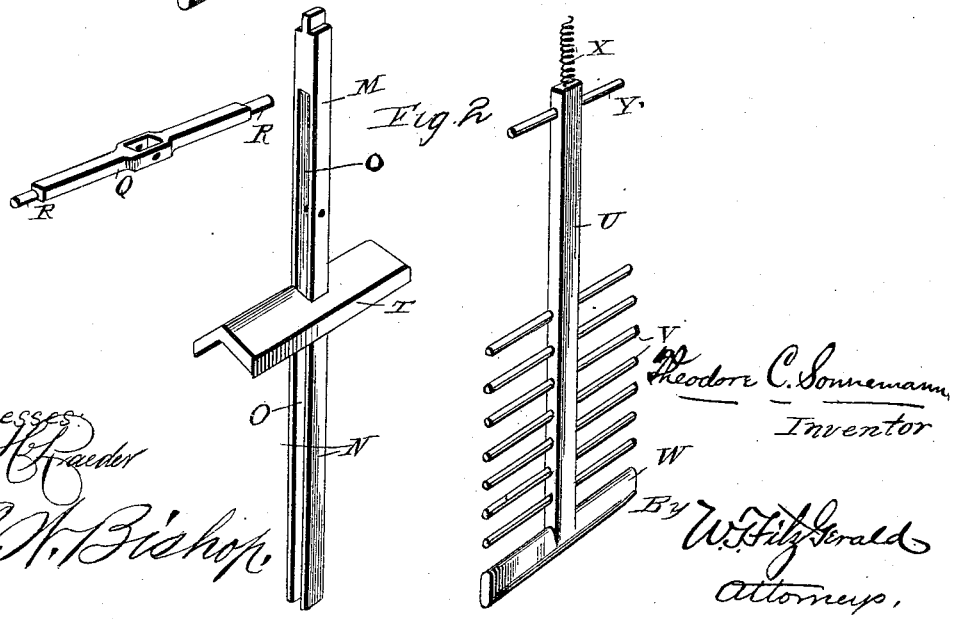
Witnesses
C. H. Raeder
R. W. Bishop
Theodore C. Sonnemann,
Inventor
By W. J. FitzGerald
Attorneys

UNITED STATES PATENT OFFICE.

THEODORE C. SONNEMANN, OF WINCHESTER, KANSAS.

CHURN.

SPECIFICATION forming part of Letters Patent No. 426,872, dated April 29, 1890.

Application filed December 20, 1889. Serial No. 334,456. (No model.)

*To all whom it may concern:*

Be it known that I, THEODORE C. SONNEMANN, a citizen of the United States, residing at Winchester, in the county of Jefferson and State of Kansas, have invented certain new and useful Improvements in Churns; and I do hereby declare the following to be a full, clear, and exact description of the invention, such as will enable others skilled in the art to which it appertains to make and use the same.

My invention relates to improvements in churns; and it consists in certain novel features hereinafter described and claimed.

In the accompanying drawings, Figure 1 is a sectional perspective view of a churn constructed in accordance with my invention. Fig. 2 is a view showing the several parts of the dasher in perspective and detached. Fig. 3 is a view of the testing-tube.

The churn-body A is supported upon legs B, of ordinary construction, and is of a substantially truncated pyramidal form, having the curved bottom C and the upwardly-converging end walls D. A rectangular box or frame E is formed above the end walls and provides a large opening through which the cream may be poured into the body. Rails or ledges F are secured to the upper end of the box E, and serve to retain the lid G thereon, as will be readily understood upon reference to Fig. 1. The lid is constructed in two sections or members, so as to fit around the dasher-rod, and the notches in their meeting edges have inclined walls to permit the dasher to vibrate in the operation of the churn. The lid is held upon the box or frame by the buttons H, pivoted upon the box and projecting over the edge of the lid, and upon each section of the lid I secure or form the vertical plates or ribs I, having a series of notches J in their upper edges, as shown, the purpose of which will be hereinafter set forth. One of the sections, furthermore, is provided with the opening J', through which a testing-tube K may be inserted into the body to ascertain the condition of the butter, the said tube having a longitudinal opening or slot L in its side, as shown in Fig. 3.

The dasher-rod M consists of a rod or bars N, having a notch or open-ended slot O extending from its lower to near its upper end, and is provided at its upper end with a cross-bar or handle P, by means of which it may be vibrated. At an intermediate point of its length the dasher-rod is provided with a transverse fulcrum-bar Q, the ends of which are cylindrical to form trunnions R and engage notches S in the upper edges of the box to support the dasher-rod therein and allow it to vibrate, and below this fulcrum-bar I secure to the dasher-rod an inverted-V-shaped plate T, which serves to deflect the cream toward the bottom of the body as it is agitated by the dasher.

The dasher consists of a vertical rod or bar U, a series of fingers or agitators V projecting laterally therefrom, and a paddle W at the lower end of said rod. The rod is fitted in the open-ended slot in the dasher-rod and is pressed normally downward by a spring X, arranged between its upper end and the upper end of the open-ended slot, as clearly shown in Fig. 1. Lateral rests Y are provided at the upper end of the rod U, and ride over the notched plates I to prevent the dasher from falling to the bottom of the churn-body, and also to give a vertical reciprocating motion to the dasher as it is vibrated.

The construction and arrangement of the several parts of my improved churn being thus made known, the operation and advantages of the same will, it is thought, be readily understood. Cream is placed in the body in the desired quantities, the dasher-lid fitted in place, and the dasher is then vibrated, so as to swing from end to end of the body. As the dasher is vibrated it will throw the cream from end to end of the body, and thus agitate the same to produce the butter. The agitation of the cream will be greatly increased and facilitated by the action of the notched plates and the lateral rests, for as the dasher is vibrated the rests will ride over the notches in the said plates and be thereby caused to rise and fall, consequently imparting a vertical reciprocating motion to the dasher and agitating the cream in a plane at right angles to that of the dasher and thoroughly breaking up the globules of the same, thus producing the butter in a minimum period of time.

My improved churn is very simple in its construction and can be easily operated.

The body is of such a form that the cream will be thrown toward the bottom thereof as it is agitated, and the dasher creates counter-currents in the cream by which it is completely and rapidly churned.

The several parts of the device can be quickly removed for the purpose of cleaning or repairing, but will be securely held in operative position when in use.

Having thus described my invention, what I claim, and desire to secure by Letters Patent, is—

1. The combination, with the churn-body, of the cover having the curved notched plates I upon it, the oscillating dasher-rod M, formed with the longitudinal slot extending up from its lower end, and the dasher fitting movably in said slot and provided at its upper end with the fingers Y, substantially as and for the purpose set forth.

2. The combination, with the churn-body, of the cover having the curved notched plates I, the oscillating dasher-rod formed with the longitudinal slot extending up from its lower end, the dasher fitting removably in said slot and provided at its upper end with the fingers Y, and the spring X, bearing against the upper end of the dasher, substantially as set forth.

3. The improved dasher consisting of the hollow dasher-rod having a fixed deflecting-plate and transverse fulcrum-bar, the dasher having a vertical bar fitted in the hollow dasher-rod, and a series of fingers projecting laterally from the said vertical bar, a spring bearing on the end of the said bar, and the curved notched plates I, substantially as set forth.

In testimony whereof I affix my signature in presence of two witnesses.

THEODORE C. SONNEMANN.

Witnesses:
J. SIMMON,
R. M. MORRISON.